(Model.)
W. H. DODGE.
DEVICE FOR TRANSMITTING POWER.
No. 359,597. Patented Mar. 22, 1887.
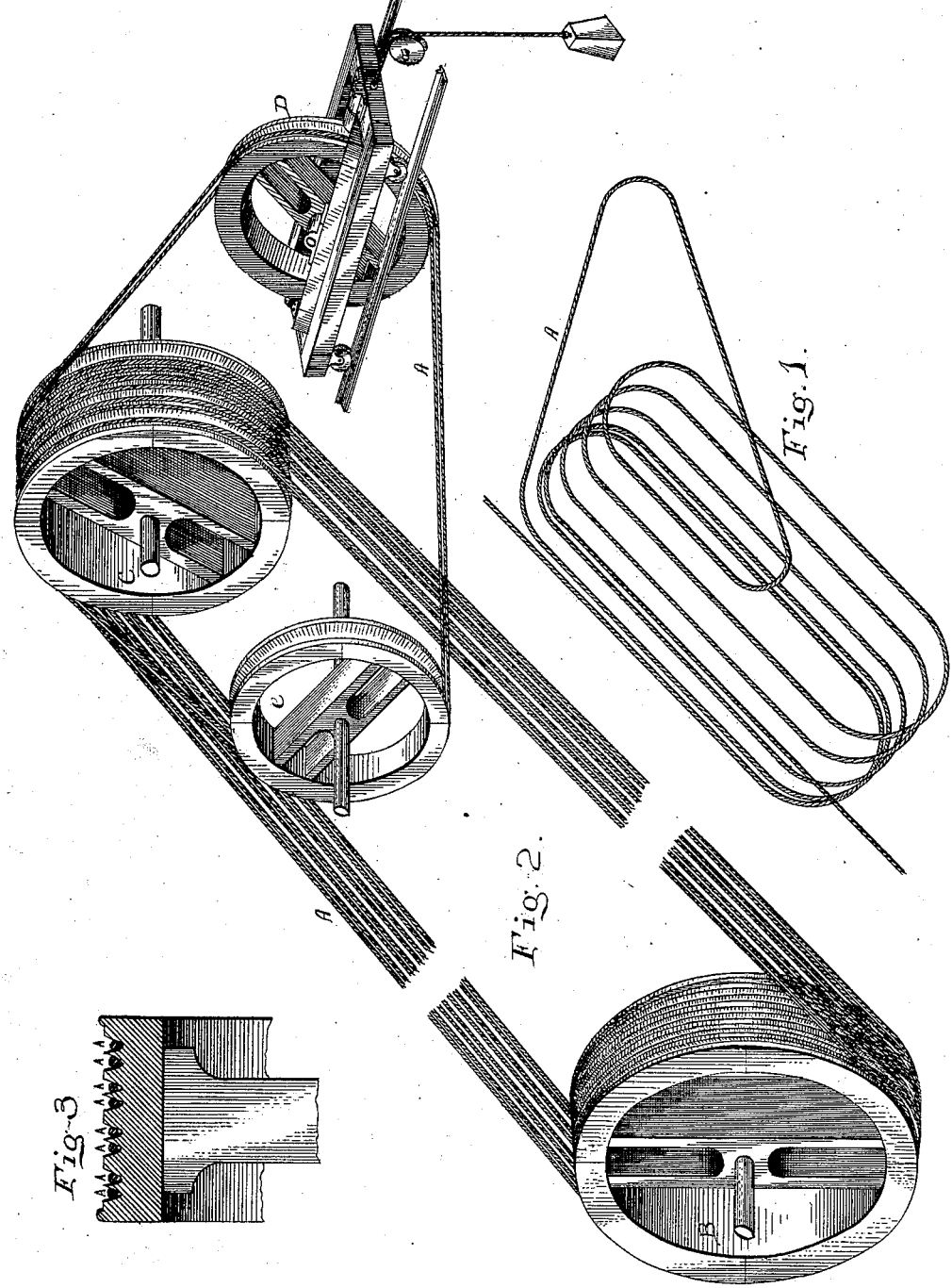
Witnesses:
Inventor
Wallace H Dodge

UNITED STATES PATENT OFFICE.

WALLACE H. DODGE, OF MISHAWAKA, INDIANA.

DEVICE FOR TRANSMITTING POWER.

SPECIFICATION forming part of Letters Patent No. 359,597, dated March 22, 1887.

Application filed August 4, 1886. Serial No. 209,969. (Model.)

*To all whom it may concern:*

Be it known that I, WALLACE H. DODGE, of Mishawaka, in the county of St. Joseph and State of Indiana, have invented a new and useful Scheme in the System of Rope Transmission for which Letters Patent were issued to me on the 23d of June, 1885, No. 320,544, of which the following is a specification.

It has been found impracticable to employ a rope belt upon a pulley the diameter whereof is less than forty times the diameter of the rope, for the reason that a curve of less radius than that is injurious and destructive to the rope by reason of limited flexibility of the rope and the unequal stress upon the inner and outer strands, which results in breaking of the outer strands. It is also apparent that, as heretofore used, the entire strain sustained by the rope is at some period of its travel sustained by the splice, and it is therefore necessary that the splice shall be equal in strength to any part of the rope. These two are practical defects in every system of rope transmission heretofore, and are obviated by my invention, the object of which is to adapt the system of transmission by ropes to the application of any desired power to pulleys of any desired size by diminishing the diameter of the rope and adapting the same to the diameter of the pulley, and attaining the required strength by increasing the number of back and forth turns between pulleys, so that if the strength required is the strength of a rope one inch in diameter and the diameter of the pulley is only twenty inches the desired strength and flexibility will be secured by employing two strands or ropes, each five-eighths of an inch in diameter. The avoidance of the second defect is also attained by the same means, because if the whole stress is supported by two strands instead of one the splice will never be required to sustain more than one-half the whole strain.

In the accompanying drawings, Figure 1 represents in diagrammatic form my scheme of rope arrangement. Fig. 2 is a perspective view of the same with the pulley and rope in operative position. Fig. 3 is a transverse section of the pulley-rim, showing the grouping of the grooves.

These drawings show the invention in a typical form only. It is applicable for all the modes or schemes for gearing or rigging up the rope belts or transmitters referred to in my said Letters Patent, and I therefore do not confine myself to the number or arrangement of pulleys shown. Therefore the following description is, for convenience only, confined to the simple typical form shown, with the understanding that the same may be indefinitely varied without changing the essential feature of the invention, which consists in substituting for a single large rope an equivalent aggregate of two or more smaller ropes, whereby the flexibility and durability are increased and the strain upon the splice diminished.

A is the rope, which is one-half, one-third, or some other equal part of the estimated required strength, and therefore is to be wound double, treble, and so on, to attain the required strength—that is to say, throughout, instead of one good-sized rope carried once, twice, or more times around the driving-pulley B and driven pulley C, and thence round the take-up pulley D, the smaller rope *a* is passed twice, four, or more times around both driving-pulley, driven pulley, and take-up, so that the rope will not only run freely around smaller pulleys than would a full-sized rope, but there will be no place in the wind-up where the splice will not be sustained by its accompanying strand, as set forth.

The mode of winding the rope upon the pulleys is shown in Fig. 1, and consists in carrying the rope once through the whole wind—that is to say, back and forth from driver B to driven pulley C as often as may be desired. It is then carried around the snub-pulley *e*, if one be used, and if not, then from the main driver or driven to the take-up D. The rope would lead back to the place of beginning, and if used as heretofore the splice would then be made; but with my improvement a new wind is commenced and the rope again carried around driver and driven as many times as formerly and again around the take-up. This may be repeated again, if desired, and at the completion of the last round the splice will be made.

The same number and relative arrangement of pulleys are shown in the drawings of this case and in my application Serial No. 209,794; but in this case the arrangement or number of the pulleys is immaterial, the invention being confined to the mode of winding the rope. In my said application No. 209,794, the invention relates to the function of the snub-pulley in relieving the journals of a part of the strain.

Having described my invention, I claim as new—

As an improvement in the devices for transmitting power, the pulleys B C, provided with a series of double grooves, and pulley D, in combination with the rope A, wound thereon double throughout, substantially as described, whereby are attained a given strength with a smaller rope, capacity to pass smaller pulleys, and a divided strain on the splice, as set forth.

WALLACE H. DODGE.

Witnesses:
WILL W. DODGE,
R. D. O. SMITH.